United States Patent
Baccouche et al.

(10) Patent No.: US 8,371,642 B2
(45) Date of Patent: Feb. 12, 2013

(54) VEHICLE BODY STRUCTURE

(75) Inventors: Ridha Baccouche, Ann Arbor, MI (US); Saeed David Barbat, Oakland, MI (US); Saied Nusier, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/978,433

(22) Filed: Dec. 24, 2010

(65) Prior Publication Data
US 2012/0161476 A1 Jun. 28, 2012

(51) Int. Cl.
*B62D 25/02* (2006.01)

(52) U.S. Cl. .............. 296/203.01; 296/187.12

(58) Field of Classification Search .......... 296/203.01, 296/187.09, 187.13, 187.1, 102, 144, 123, 296/193.09, 193.06, 193.12, 205, 203.02, 296/29, 30; 293/132, 133
See application file for complete search history.

(56) References Cited

U.S. PATENT DOCUMENTS

| | | | | |
|---|---|---|---|---|
| 4,909,565 A * | 3/1990 | Harasaki et al. | ......... | 296/187.09 |
| 5,882,064 A * | 3/1999 | Emmons | ............... | 296/193.04 |
| 5,984,402 A * | 11/1999 | Takeuchi | ................ | 296/187.12 |
| 6,099,039 A | 8/2000 | Hine | | |
| 6,129,410 A * | 10/2000 | Kosaraju et al. | ......... | 296/187.12 |
| 6,899,195 B2 * | 5/2005 | Miyasaka | ..................... | 180/312 |
| 6,926,350 B2 * | 8/2005 | Gabbianelli et al. | ..... | 296/203.01 |
| 6,988,763 B2 | 1/2006 | Saeki | | |
| 7,510,234 B2 * | 3/2009 | Ameloot et al. | ......... | 296/187.12 |
| 7,574,801 B2 * | 8/2009 | Lowe et al. | .................. | 29/897.2 |
| 7,699,346 B2 | 4/2010 | Wehner | | |
| 7,731,272 B2 | 6/2010 | Moore | | |
| 2001/0002760 A1 * | 6/2001 | Gabbianelli et al. | ........ | 296/146.9 |
| 2006/0208537 A1 * | 9/2006 | Dingman et al. | ......... | 296/193.05 |
| 2008/0001434 A1 * | 1/2008 | Henkelmann | ............ | 296/187.12 |

FOREIGN PATENT DOCUMENTS

JP 2005161890 A 6/2005

* cited by examiner

*Primary Examiner* — Glenn Dayoan
*Assistant Examiner* — Sunsurraye Westbrook
(74) *Attorney, Agent, or Firm* — Gigette M. Bejin; Jason Rogers

(57) ABSTRACT

A vehicle body structure having improved roof strength and reduced weight is provided. The vehicle body structure includes a first roof rail, a second roof rail, a first rocker rail and a second rocker rail. A closed-section roof bow may join the first roof rail and the second roof rail. The closed roof bow is substantially perpendicular to the first and second roof rails. A B-Pillar may be provided for each of the first roof rail and the second roof rail. Each B-Pillar defines a B-Pillar hinge joint and each A-Pillar defines an A-Pillar hinge joint between the roof end and the cowl end. A cowl may also be provided which may be disposed substantially perpendicular to the first and second roof rails. The cowl may be coupled to the first and second roof rails via the A-Pillar corresponding to the first roof rail and the A-Pillar for the second roof rail.

3 Claims, 4 Drawing Sheets

VEHICLE BODY STRUCTURE

BACKGROUND

The present disclosure relates generally to vehicle structures, and more particularly to a lightweight roof structure having improved roof crush strength.

Automotive and vehicle manufacturers today are striving to contain and/or reduce costs while competing globally. In order to meet these goals, the automotive and vehicle manufacturers have investigated various solutions. These solutions include reducing the mass and thus the weight of the vehicles. Where possible or appropriate, solutions may also include: reducing the number of new manufacturing techniques; substituting different materials to particularly lighter weight materials; redesigning parts to reduce their weight, downsizing the vehicle for its individual components; and applying design techniques that result in more efficient structures and use of materials. Once of those design techniques also involves improving the aerodynamics of the vehicle and thus reducing their drag. Various improvements have also been made in vehicle engines and powertrain technology which are directed to meeting fuel economy standards.

The majority of parts for most vehicles are made from steel materials. Steel has many proven advantages, such as low cost, excellent manufacturability, recyclability, and crash energy management capability. The redesign of steel parts and the ability to make the parts from various types, gauges, and strengths of steel materials have helped create automobiles.

The body shell of a vehicle (a/k/a "body-in-white") is the skeletal structure to which various subsystems subsequently are attached. These subsystems include the engine and drivetrain, suspension and wheels, interior components, and exterior body components, such as doors, glass, hood and trunk lid. Since the body in white (BIW) typically represents approximately 20-25% of the total weight of a vehicle, efforts have been made to reduce the weight of the BIW. Any reductions in weight or use of different structures and materials, however, have to be done in cooperation with meeting various structural, rigidity, and dimensional parameters in order to produce a satisfactory vehicle.

In particular, vehicle manufacturers strive to improve the roof crush strength of a vehicle body structure while reducing weight. While substitution of materials may reduce vehicle weight, roof crush strength may not be comprised.

SUMMARY

A vehicle body structure having improved roof strength and reduced weight is provided according to the embodiment(s) disclosed herein. The vehicle body structure includes a first roof rail, a second roof rail, a first rocker rail and a second rocker rail. A closed-section roof bow joins the first roof rail and the second roof rail. The closed roof bow may be substantially perpendicular to the first and second roof rails. A B-Pillar may be provided for each of the first roof rail and the second roof rail. Each B-Pillar defines a B-Pillar hinge joint and each A-Pillar defines an A-Pillar hinge joint. A cowl may be also provided which may be disposed substantially perpendicular to the first and second roof rails. The cowl may be coupled to the first and second roof rails via the A-Pillar which corresponds to the first roof rail and the A-Pillar for the second roof rail.

BRIEF DESCRIPTION OF THE DRAWINGS

The present invention will now be described by way of example, with reference to the accompanying drawings.

DETAILED DESCRIPTION

Figure 1:
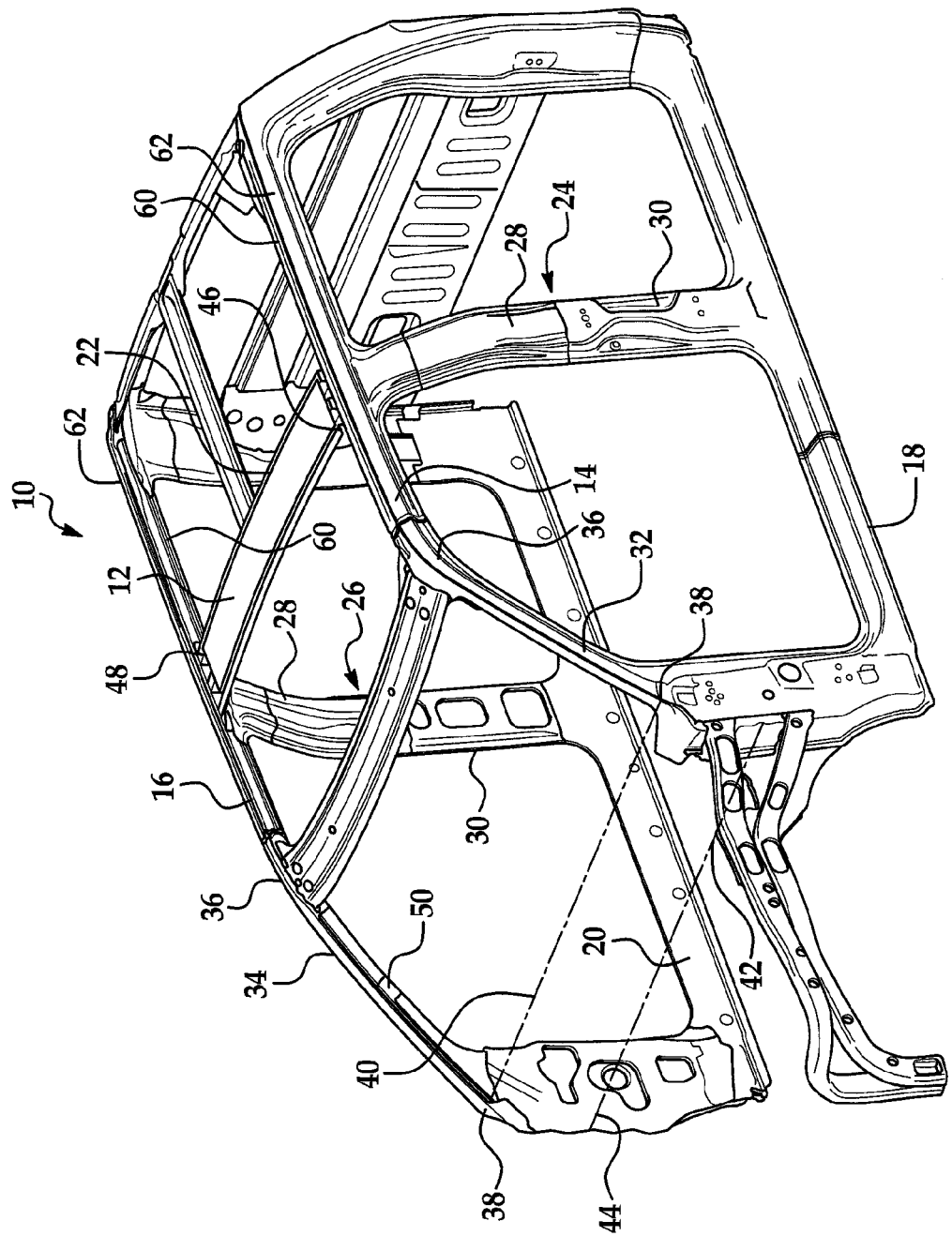
FIG. 1 illustrates a perspective view of an embodiment of the vehicle body structure of the present disclosure.
Figure 2:
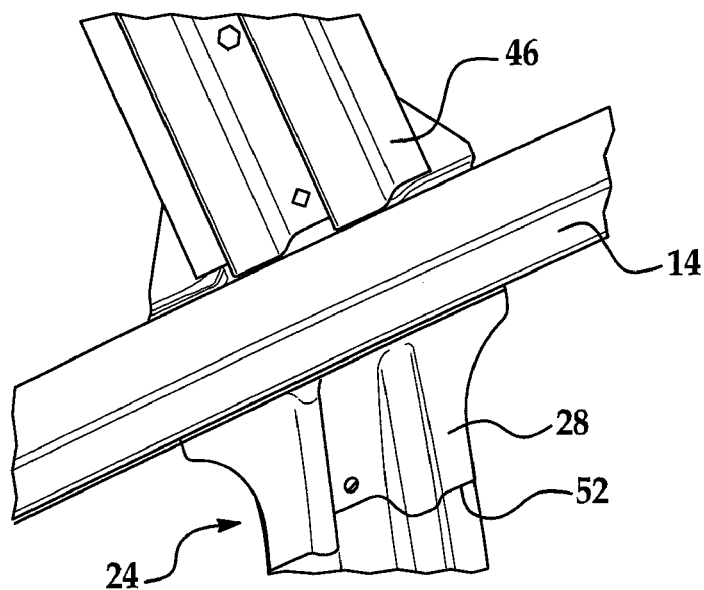
FIG. 2 illustrates a partial, perspective view of an embodiment of the joint between the upper B-Pillar and the roof rail of the vehicle body structure of the present disclosure.

Referring now to FIG. 1, a vehicle body structure 10 is shown for the passenger compartment of a vehicle. The present disclosure includes a vehicle body structure 10 which has reduced weight and increased roof strength by controlling the absorption of energy when loads are applied to the roof which includes the roof bow 12 and the first and second roof rails 14, 16.

Figure 5:
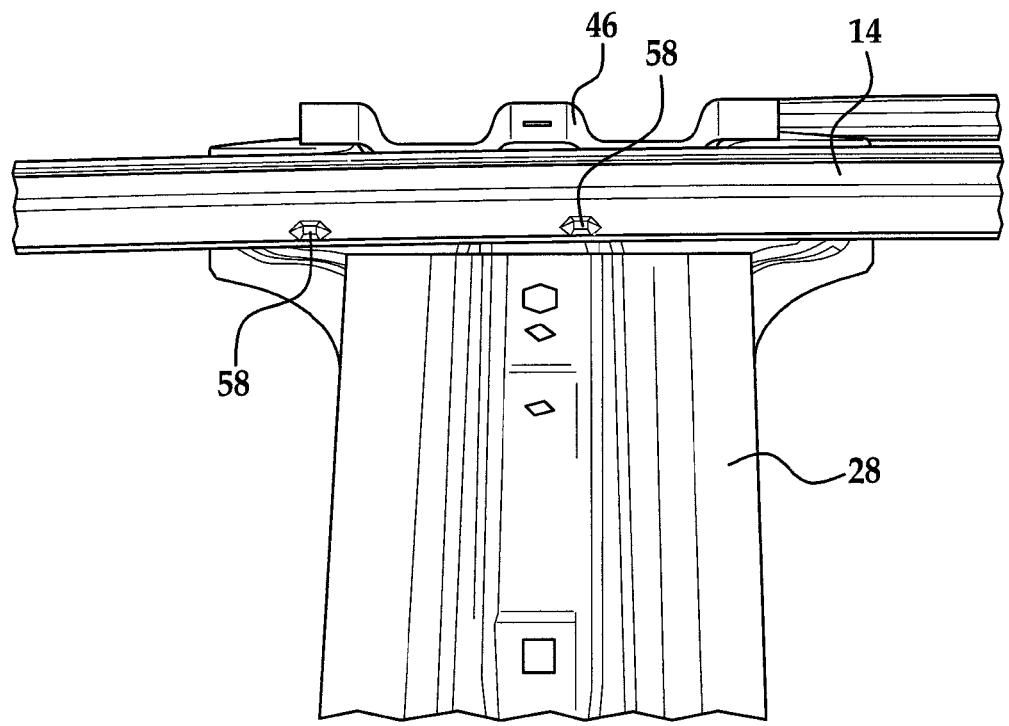
FIG. 5 illustrates a partial, side view of an embodiment of the joint between the upper B-Pillar and the roof rail of the vehicle body structure of the present disclosure.
Figure 6:
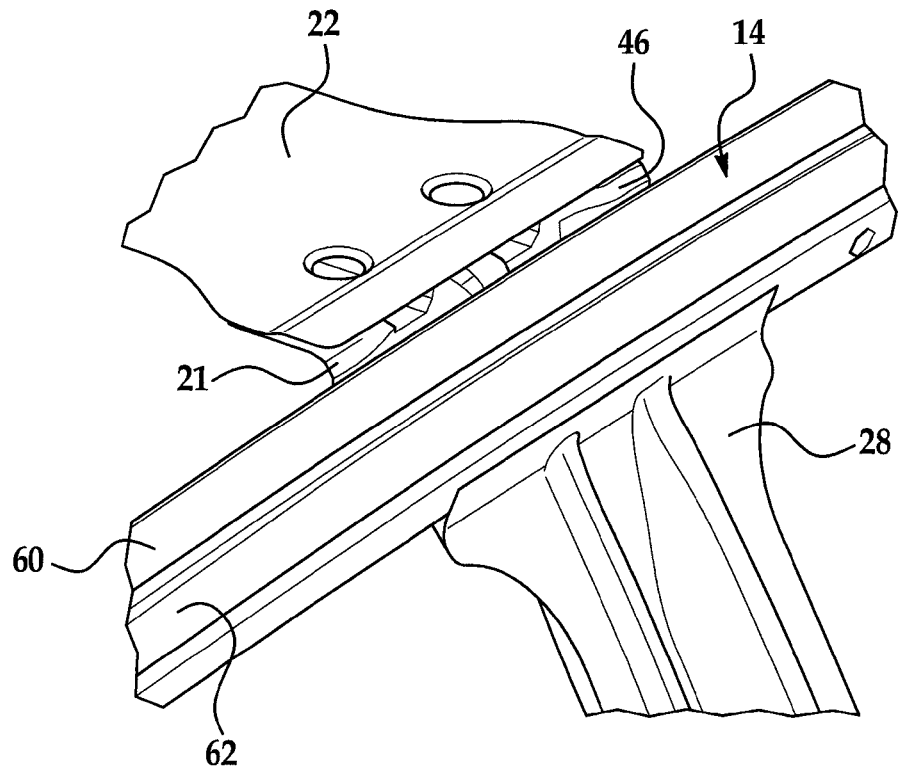
FIG. 6 illustrates a partial, perspective view of an embodiment of the joint between the upper B-Pillar and the closed section roof rail of the vehicle body structure of the present disclosure.

Referring to FIGS. 1, 5 and 6, the present disclosure includes a first roof rail 14 and a second roof rail 16 and at least one closed-section roof bow 12 joining the first roof rail 14 and the second roof rail 16. The closed section roof bow 12 may be a stamped or roll formed member which may be affixed to a cover member 22 as shown in FIG. 6. The closed roof bow 12 may be substantially perpendicular to the first and second roof rails 14, 16.

The vehicle body structure 10 of the present disclosure may further include a first rocker rail 18 and a second rocker rail 20 wherein the second rocker rail 20 may be disposed substantially parallel to the first rocker rail 18. A first B-Pillar 24 for the first roof rail 14 may be provided as well a second B-Pillar 26 which corresponds to the second roof rail 16. Each of the first B-Pillar 24 and the second B-Pillar 26 include an upper end 28 and a lower end 30. Each of the first B-Pillar 24 and the second B-Pillar 26 define a B-Pillar hinge joint 52 between the upper end 28 and the lower end 30. The B-Pillar hinge joint 52 may be a crush initiator in the form of a bend in the sheet metal as shown in the non-limiting example of FIGS. 3 and 4. It is also to be understood that the crush initiator in the B-Pillar hinge joint 52 may take other forms such as an aperture or the like.

The upper end 28 of each B-Pillar may be joined to the B-Pillar's corresponding roof rail which may be either the first roof rail 14 or the second roof rail 16. Therefore, the upper end 28 of a first B-Pillar 24 may be joined to the first roof rail 14 as shown in FIG. 1. Likewise, the upper end 28 of the second B-Pillar 26 may be joined to the second roof rail 16 as shown in FIG. 1.

Figure 3:
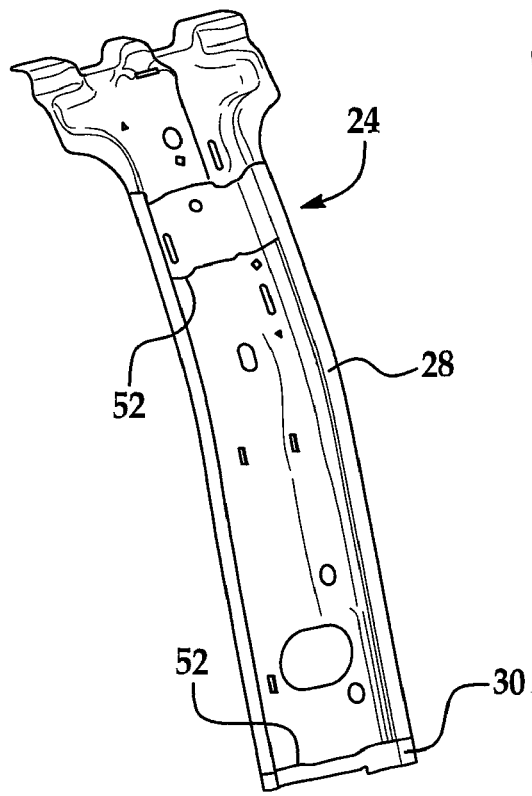
FIG. 3 illustrates a perspective view of an embodiment of the upper B-Pillar of the vehicle body structure of the present disclosure.
Figure 4:
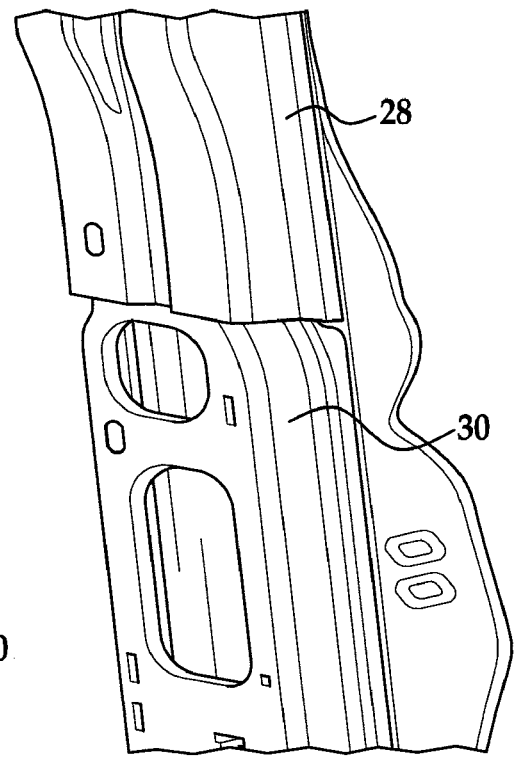
FIG. 4 illustrates a partial, perspective view of an embodiment of the joint between the upper B-Pillar and the lower B-Pillar of the vehicle body structure of the present disclosure.

Referring now to FIGS. 1, 3 and 4, the first B-Pillar 24 and the second B-Pillar 26 may be each formed from an upper end 28 and a lower end 30. Referring now to FIGS. 1, 3 and 4, the lower end 30 of the first B-Pillar 24 may be integral to the first rocker rail 18. Likewise, the lower end 30 of the second B-Pillar 26 may be integral to the second rocker rail 20. As shown in FIGS. 3 and 4, each of the lower ends 30 are operatively configured to interlock with each of the upper ends 28 of each of the first B-Pillar 24 and second B-Pillar 26. Accordingly, the lower end 30 of the first B-Pillar 24 interlocks with the upper end 28 as shown in the non-limiting example illustrated in FIGS. 3 and 4.

As shown in FIG. 1, each of the first and second B-Pillars 24, 26 includes a lower end 30 which may be formed from stamped sheet metal. The lower end 30 may also be formed using a roll forming process or the like. Referring now to the non-limiting example shown in FIGS. 3 and 4, the first and second B-Pillars 24, 26 may each be formed by the lower end 30 being gloved or inter-fitted with the upper end 28. The lower end 30 and the upper end 28 may be affixed to one another via a welding process or the like.

Figure 7:
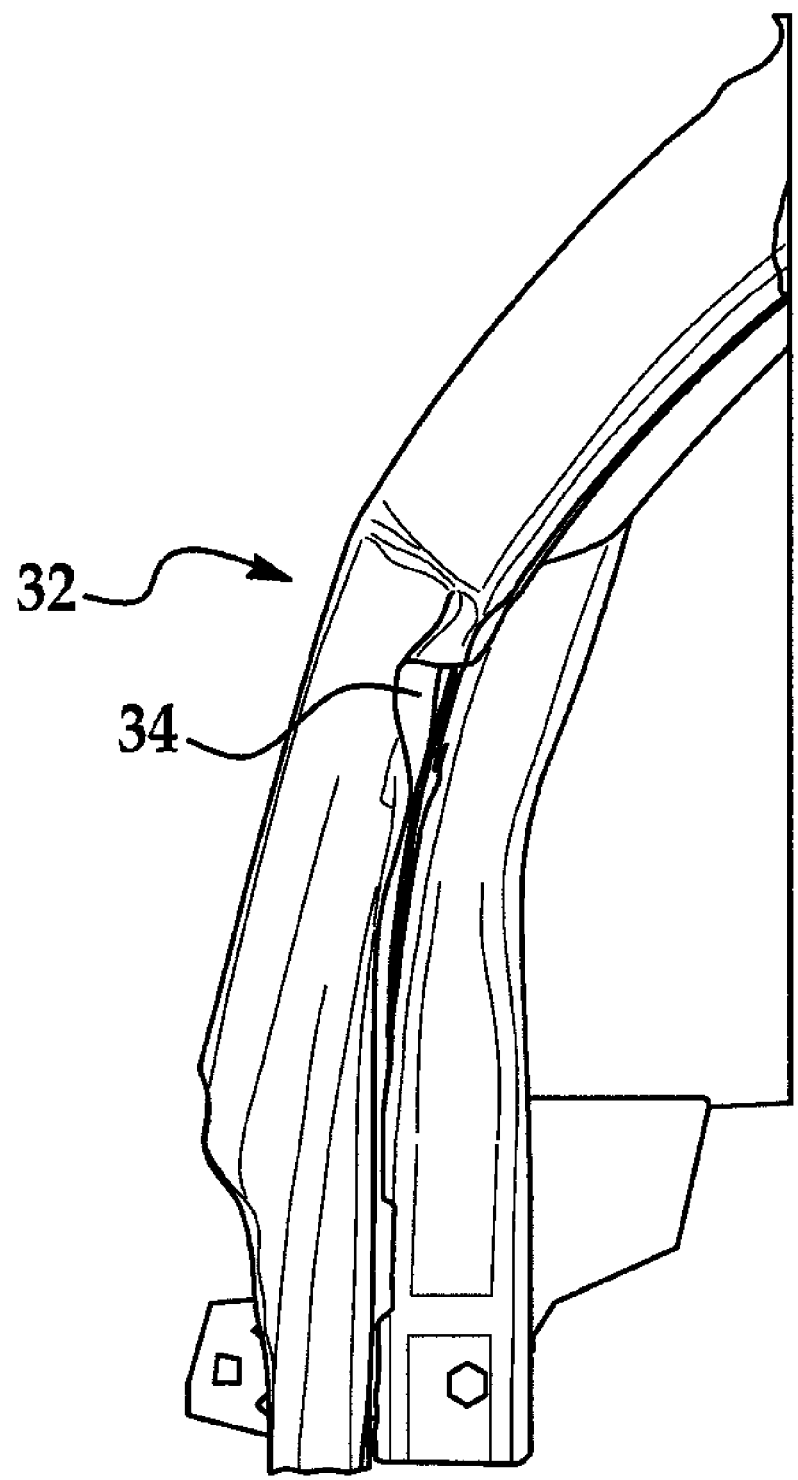
FIG. 7 illustrates a partial front view of an A-Pillar of an embodiment for a vehicle body structure of the present disclosure.

Referring now to FIGS. 1 and 7, a first A-Pillar 32 may be provided for the first roof rail 14 and a second A-Pillar 34 provided for the second roof rail 16. The first A-Pillar 32 and the second A-Pillar 34 each include a roof end 36 and a cowl end 38. As shown in FIG. 7, the roof end 36 for each A-Pillar (the first A-Pillar 32 and the second A-Pillar 34) may be affixed to a corresponding roof rail (the first roof rail 14 and the second roof rail 16). Accordingly, the roof end 36 of the first A-Pillar 32 may be affixed to the first roof rail 14. Further, the roof end 36 of the second A-Pillar 34 may be affixed to the second roof rail 16. The first and the second A-pillars 32, 34 each define an A-Pillar hinge joint 50 between the roof end 36 and the cowl end 38. The A-Pillar hinge joint 50 defined in each of the first and second A-Pillars 32, 34 may be a crush initiator in the form of the non-limiting example of a bend in the first A-Pillar structure as shown in FIG. 7. Other non-limiting examples of the A-Pillar hinge joint 50 may be apertures or recesses or the like formed in the A-Pillar structure.

As shown in FIG. 1, a cowl 40 is also provided wherein the cowl 40 includes a first end 42 and a second end 44. The cowl 40 may be disposed transverse to the vehicle and may be substantially perpendicular to the first roof rail 14 and the second roof rail 16. As shown, the cowl 40 connects to the first A-Pillar 32 at the first end 42 of the cowl 40. Further, the cowl 40 connects to the second A-Pillar 34 at the second end 44 of the cowl 40.

Referring now to FIGS. 1 and 6, the closed section roof bow 12 includes a first bow end 46 and a second bow end 48. The first bow end 46 of the roof bow 12 may be coupled to the first B-Pillar 24 via the first roof rail 14. The second bow end 48 of the roof bow 12 may be coupled to the second B-Pillar 26 via the second roof rail 16 as shown in FIG. 1. In the non-limiting example of FIG. 1, the closed section roof bow 12 may include a cover member and a roll-formed member affixed to the cover member via mechanical fasteners, spot welding or the like. It is also to be understood that, in yet another non-limiting example, the close section roof bow 12 may be a single piece member which may be manufactured using a roll forming process, hydroforming process, extrusion process or the like.

The first roof rail 14 and the second roof rail 16 may each be formed from a single component. Alternatively, the first roof rail 14 and the second roof rail 16 may be formed from multiple components. FIGS. 1, 5 and 6 illustrate a non-limiting example where the first roof rail 14 and the second roof rail 16 are each manufactured from an outer roof rail 62 and an inner roof rail 60. The first roof rail 14 and the second roof rail 16 may each therefore be formed from an outer roof rail 62 and an inner roof rail 60. As shown, the inner roof rail 60 may be affixed to an outer roof rail 62. It is also to be understood that the second roof rail 16 may be formed of an inner roof rail 60 affixed to an outer roof rail 62.

Referring to FIG. 6, a partial view of a non-limiting example of an embodiment of the closed section roof bow 12 is shown. The closed section roof bow 12 may be made from a stamped lower member 21 and a cover member 22. The roof bow 12 may be affixed to the first roof rail 14 or the second roof rail 16 via welding or mechanical fasteners 58 or the like. As shown in the non-limiting example of FIG. 6, the first B-Pillar 24 may join the first roof rail 14 where the roof bow 12 joins the first roof rail 14.

It will be appreciated by those skilled in the art that, although the invention has been described with reference to one or more preferred embodiments, the invention is not limited to these disclosed embodiments and that various alternative embodiments or modifications to the disclosed embodiments could be made without departing from the scope of the invention.

What is claimed is:

1. A vehicle body structure comprising:
a first roof rail and a second roof rail;
a closed section roof bow joining the first roof rail and the second roof rail, the closed roof bow being substantially perpendicular to the first and second roof rails;
a first rocker rail and a second rocker rail disposed substantially parallel to the first rocker rail;
a first B-Pillar affixed to the first roof rail and a second B-Pillar affixed to the second roof rail, the first and second B-Pillars each defining a sheet metal bend operatively configured to provide controlled energy absorption when a roof load is applied, each of the first and second B-Pillars having an upper end and a lower end, the upper end of the first B-Pillar affixed to the first roof rail and the upper end of the second B-Pillar affixed to the second roof rail, the lower end of the first B-Pillar affixed to the first rocker rail and the lower end of the second B-Pillar affixed to the second rocker rail;
a first A-Pillar affixed to the first roof rail and a second A-Pillar affixed to the second roof rail, the first and second A-Pillars each having a roof end and a cowl end and each defining an A-Pillar hinge joint between the roof end and the cowl end of each of the first and second A-Pillars; and
a cowl connecting the A-Pillar of the first roof rail to the A-Pillar of the second roof rail.

2. The vehicle body structure as defined in claim 1 wherein the B-Pillar includes an inner member and an outer member.

3. The vehicle body structure as defined in claim 2 wherein the inner member and the outer member both define the the sheet metal bend.

* * * * *